Sept. 20, 1966   F. C. GLEASON ET AL   3,273,689
APPARATUS FOR LOADING OBJECTS INTO AN INDEX TABLE
Original Filed June 29, 1962
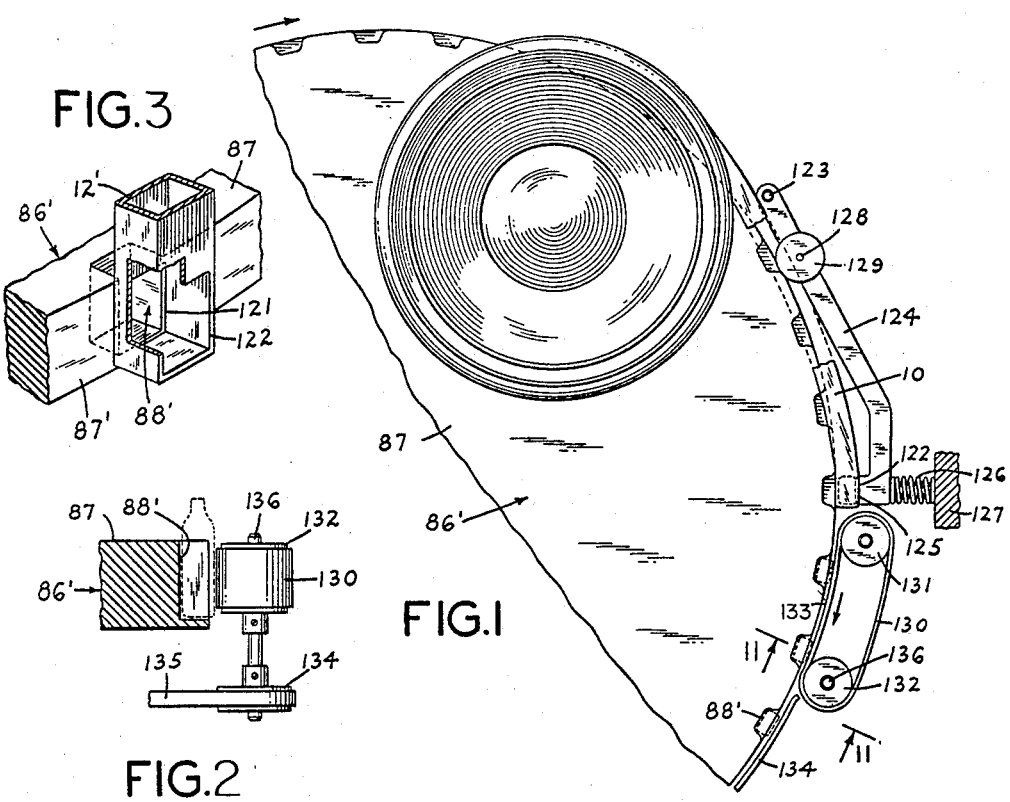
INVENTORS
FRED C. GLEASON AND
BY EDWARD E. BYRNES 3,273,689
APPARATUS FOR LOADING OBJECTS INTO AN
INDEX TABLE
Fred C. Gleason, Cannondale, Conn., and Edward E. Byrnes, South Bend, Ind., assignors to American Home Products Corporation, New York, N.Y., a corporation of Delaware
Original application June 29, 1962, Ser. No. 206,480, now Patent No. 3,212,668, dated Oct. 19, 1965. Divided and this application July 9, 1965, Ser. No. 484,146
2 Claims. (Cl. 198—24)

This is a division of our copending application Serial No. 206,480, which was filed June 29, 1962, and has since matured into USP 3,212,668.

The present invention relates generally to apparatus for handling a series of objects of substantially similar configuration. More particularly the invention relates to apparatus for automatically loading a series of objects into an index table.

While not restricted thereto, the invention is particularly useful for loading plastic, top-necked bottles, preparatory to the automatic filling and capping of said bottles as they are conveyed on a feed line. With the ever-widening acceptance of the packaging of liquid products in plastic bottles, it has become an increasingly greater problem to provide dependable, rapidly-operating, substantially fully automatic means for loading large quantities of plastic bottles into separate pockets in an index table preparatory to filling and closing of the bottles, for replacing the conventional laborious, time-consuming and costly manual operations.

With the foregoing in view, it is a primary object of the present invention to provide a simple, highly efficient and economical apparatus for automatically loading a plurality of bodies into the pocket of an index table preparatory to the use of such objects.

Yet another object is to provide an index table having object-receiving pockets each of which is automatically and sequentially filled with one of the objects delivered by the delivery chute assembly.

Other objects and advantages of the invention will become apparent as a result of a better understanding thereof upon reference to the following description.

In a particularly preferred embodiment of the index table means and loading assembly, the index table means comprises a plurality of pockets each positionable seriatim in alignment with a chute having the lower laterally disposed discharge end thereof operatively associated with the index table, each of the pockets being adapted to receive an object from the discharge end of the chute; ejector means that are operatively associated with the chute adjacent the discharge end, the ejector means comprising pusher means extending through a wall of the chute and adapted to eject an object in upright disposition from the discharge end of the chute with one of the pockets in the index table; and means to cause transfer of an object from the discharge end of the chute into a pocket of the index table by said ejector means when the pocket moves into alignment with said discharge end. The means to cause said transfer may comprise the surface of the index table itself through which the openings of the pockets are presented. The pockets may be open-sided for in seriatim alignment with the, in this case, open-sided discharge end of the chute. Cam follower means may be provided which utilize the side edge of the index table and the open sides of the pockets as a camming surface for said follower means which is thus actuated to push an object laterally through the open side of the chute into an open-sided pocket aligned therewith.

A specific embodiment of the invention and several modifications of components thereof will now be described with reference to the accompanying drawings wherein FIG. 1 is a plan view of a fragment of an index table and bottle inserter mechanism in accordance with the invention, parts being broken away to show the cam follower structure;

FIG. 2 is a vertical sectional view of the structure shown in FIG. 1 taken generally on section line 11—11 of the latter; and FIG. 3 is a perspective view of the chute and adjacent index table structure shown in FIG. 1, but with the inserter arm removed.

In the bottom chute structure and index table means illustrated in FIGS. 1, 2 and 3, chute 12' is provided with opposed side openings 121 and 122 (best seen in FIG. 3). The side opening 121 (to the left as viewed in FIG. 1) has alignable therewith in sequence spaced pockets 88', which in this case are located in the periphery of index table 86', to open out on the side edge surface 87' of said table as well as at the top surface 87 thereof. Pivotally mounted beside the periphery of index table 86' on a shaft 123 is a lever plunger arm 124 which has the plunger end 125 in alignment with the opening 122 in the right side of chute 12'. Plunger arm 124 is urged to the left (FIG. 1) by means of spring 126 mounted between said plunger arm 124 and a support 127 shown in fragment whereby plunger end 125 tends to enter said opening 122. Mounted by means of pin 128 at the other end of plunger arm 124 in the region closer to pivot shaft 123 is a cam wheel 129. Cam wheel 129 is positioned so that it rides on the peripheral edge 87' of table 86' and is in alignment with the side opening of a pocket 88' in table 86' at the time the open side 121 of chute 12' is in alignment with another pocket 88'.

Beyond chute 12' in the direction of rotation of 86' is an endless belt 130 which is mounted on a pair of rollers 131 and 132, and has one surface 133 thereof in abutment with the periphery 87' of table 86' to function as a closure for the pockets 88' passing thereby. Beyond endless belt 130 in the direction of rotation of table 86', a rail 134 takes over the function of retaining bottles inserted in pockets 88' of index table 86' until they are removed for filling at a station (not shown). As shown in FIG. 2, roller 132 has mounted on the shaft 136 thereof for rotation therewith a driven pulley 134 around which is looped driving belt 135 which in turn is connected to the driving mechanism (not shown) of table 86'.

As will be apparent, in the operation of the modification of the chute and index assembly just described, bottles coming to the closed end of chute 12' are forced sideways via side opening 121 in chute 12' and into an aligned pocket 88' by means of the end 125 of plunger arm 124 which is forced to the left by spring 126, when cam wheel 129 entering another of pockets 88', permits such actions.

It will be understood that the above-described embodiment of the present invention is merely illustrative thereof, and that many other arrangements and embodiments of the apparatus and/or of the components thereof may readily be devised by those skilled in the art without departing from the spirit and scope of the invention as set forth in the appended claims.

We claim:
1. Apparatus for positioning a series of generally elongate objects of predetermined cross-sectional dimensions, said apparatus comprising:
  (1) a substantially vertical chute adapted to permit passing of the elongate objects axially therethrough said chute comprising walls forming an upper end and a lower discharge end comprising an unyield- ing bottom member for totally arresting axial movement of objects reaching said end, and a lateral opening in one of said unyielding walls of said chute above said bottom member to permit lateral exiting therefrom of an arrested object;

(2) means in communication with the upper end of the chute for furnishing elongate objects axially and seriatim thereto;

(3) a rotable circular index table mounted for rotation on a substantially vertical axis, said index table having a plurality of pockets therein located in the periphery thereof, each of said pockets having a lateral opening therein, said table being rotatable with respect to said discharge end of said chute for causing seriatim aligned communication of each of the lateral openings in said pockets with the lateral opening in said discharge end of said chute; and (4) means for urging a totally arrested object in said discharge end of said chute laterally through the lateral opening in said chute and into one of said pockets of said index table via said lateral opening in said pocket, said means comprising an opening in another wall of said chute, an elongate lever arm having a pusher element mounted at one end region thereof, means pivotally mounting said elongate lever arm at the other end region thereof for movement in a direction wherein said pusher element extends through the opening in said other wall of said chute and toward said opening in said one of said walls of said chute, resilient means biasing said lever arm intermediate said end regions thereof toward said direction, a cam follower mounted on said lever arm for movement therewith in the same general direction as said pusher element moves, said cam follower bein positioned on said lever arm and proportioned for entry into the lateral opening in one of said pockets each time the lateral opening of another of said pockets is in alignment with the lateral opening in said chute whereby said biasing means are permitted to urge said lever arm in said direction.

2. Apparatus for positioning a series of generally elongate objects of predetermined cross-sectional dimensions as defined in claim 1, wherein endless belt means are provided adjacent the periphery of said index table, said endless belt means extending from a point adjacent said chute along a portion of said periphery of said index table in the direction of rotation of the latter for maintaining objects which have been positioned in said pockets, and a fixed rail adjacent the periphery of said index table and extending from a point adjacent said belt means and extending along a portion of said periphery of said index table in the direction of rotation of the latter.

References Cited by the Examiner

UNITED STATES PATENTS 2,395,511  2/1946  Simpson _____ 198—24 X

EVON C. BLUNK, *Primary Examiner.*

R. M. WALKER, M. L. AJEMAN, *Assistant Examiners.*

UNITED STATES PATENT OFFICE
CERTIFICATE OF CORRECTION

Patent No. 3,273,689                      September 20, 1966

Fred C. Gleason et al.

It is hereby certified that error appears in the above numbered patent requiring correction and that the said Letters Patent should read as corrected below.

Column 3, lines 3 and 4, strike out "opening in one of said unyielding walls of said chute above said bottom member to permit lateral exit-" and insert instead -- opening in one of said walls of said chute above said unyielding bottom member to permit lateral exit- --; line 9, for "a rotable circular index table mounted for rota-" read -- a rotatable circular index table mounted for rota- --; line 31, for "intermediate said end regions thereof toward said" read -- toward said --; column 4, line 1, for "direction, a cam follower mounted on said lever arm" read -- direction, a cam follower mounted on said lever arm intermediate said end regions thereof --; line 4, for "lower bein positioned on said lever arm and pro-" read -- lower being positioned on said lever arm and pro- --.

Signed and sealed this 18th day of March 1969.

(SEAL)
Attest:

EDWARD M. FLETCHER, JR.                     EDWARD J. BRENNER
Attesting Officer                          Commissioner of Patents